United States Patent
Wittenbrook

[11] 3,879,186
[45] Apr. 22, 1975

[54] GROWTH CONTROL OF TURF
[75] Inventor: Lawrence S. Wittenbrook, Marysville, Ohio
[73] Assignee: O. M. Scott & Sons Company, Marysville, Ohio
[22] Filed: June 22, 1973
[21] Appl. No.: 372,600

[52] U.S. Cl. .................. 71/76; 71/93; 260/348 AS
[51] Int. Cl. .............................................. A01n 9/22
[58] Field of Search .................................. 71/93, 76

[56] References Cited
UNITED STATES PATENTS
3,544,570  12/1970  Timmler et al. ..................... 71/93
3,585,197  6/1971  Seidel et al. ........................ 71/93

OTHER PUBLICATIONS
Gut et al., Chem. Abst., Vol. 61, (1964) 5651d.
Matolesy et al., Chem. Abst., Vol. 69, (1968) 2039t.

*Primary Examiner*—Lewis Gotts
*Assistant Examiner*—Catherine L. Mills
*Attorney, Agent, or Firm*—James B. Raden; Harold J. Holt

[57] ABSTRACT

The upright growth of turf grasses is inhibited without adverse effect on turf quality by the application to the turf of a compound of the formula

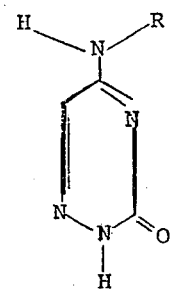

wherein R is hydrogen, methyl, ethyl, furfuryl,

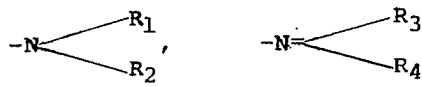

or

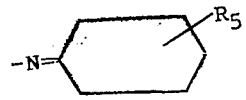

in which
R$_1$ is hydrogen or methyl;
R$_2$ is hydrogen, phenyl, acetyl or propionyl when R$_1$ is is hydrogen and R$_2$ is methyl when R$_1$ is methyl;
R$_3$ is hydrogen or C$_1$-C$_6$ alkyl;
R$_4$ is C$_1$-C$_6$ alkyl, phenyl or C$_1$-C$_3$ carboalkoxy; and
R$_5$ is hydrogen or C$_1$-C$_6$ alkyl.

7 Claims, No Drawings

GROWTH CONTROL OF TURF

This invention relates to a process and composition for controlling the growth of turf by the application to the turf of certain amino substituted 1,2,4-triazinones.

A number of compounds have been suggested for controlling the upright growth of turf to reduce the need for mowing. U.S. Pat. No. 3,462,257, assigned to the present assignee, discloses the use of nitrogen fertilizers in combination with certain triazinones, namely 6-azauracil and its derivatives and salts, both to control turf and improve its quality. However, 6-azauracil must be used in carefully controlled amounts to avoid injury to the turf. It would be desirable to provide a composition which controls turf growth but which provides a greater margin of safety in use.

A principal object of the present invention is the provision of a process and composition for the effective control of turf growth which both substantially reduces the upright growth of turf and which provides a greater margin of safety in use than has heretofore been possible.

A more specific object of this invention is the provision of a process and composition for inhibiting the upright growth of cool season turfgrasses and some monocot weed species found with turfgrasses without adverse effect on overall turf quality.

The foregoing and other objects of the invention are achieved by a process comprising application to the turf of a growth regulating amount of a compound of the formula

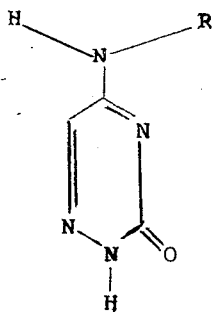

FORMULA I wherein R is hydrogen, methyl, ethyl, furfuryl,

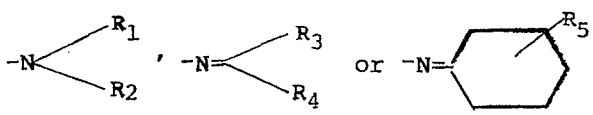

in which $R_1$ is hydrogen or methyl;
$R_2$ is hydrogen, phenyl, acetyl or propionyl when $R_1$ is hydrogen and $R_2$ is methyl when $R_1$ is methyl;
$R_3$ is hydrogen or $C_1-C_6$ alkyl;
$R_4$ is $C_1-C_6$ alkyl, phenyl or $C_1-C_3$ carboalkoxy; and
$R_5$ is hydrogen or $C_1-C_6$ alkyl.

The compounds of the invention are comparable in growth inhibiting activity to 6-azauracil but can be used at higher application rates without damage to the turf. At equivalent rates of application, the present compounds have lower phytotoxicity and thus provide a greater margin of safety in use. They are preferably applied at a rate providing from about 0.1 to 16 lbs/acre of compound. The period of plant retardation normally lasts from 4 to 5 weeks, altho the period may be greater or less than this depending upon the rate of application.

Examples of compounds falling within the scope of the Formula I are:

1. 5-amino-1,2,4-triazin-3(2H)-one
2. 5-furfurylamino-1,2,4-triazin-3(2H)-one
3. 5-methylamino-1,2,4-triazin-3(2H)-one
4. 5-hydrazino-1,2,4-triazin-3(2H)-one
5. 5-(2'-phenylhydrazino) - 1,2,4-triazin-3(2H)-one
6. 5-(2'2'-dimethylhydrazino)-1,2,4-triazin-3(2H)-one
7. 5-(2'-acetylhydrazino)-1,2,4-triazin-3(2H)-one
8. 5-(2'-isopropylidenehydrazino)-1,2,4-triazin-3(2H)-one
9. 5-(2'-ethylpyruvalidene hydrazino)-1,2,4-triazin-3(2H)-one
10. 5-(2'-tridecyli-7-denehydrazino)-1,2,4-triazin-3(2H)-one
11. 5-(2'-3(3-methylcyclohexylidene)hydrazino)-1,2,4-triazin-3(2H)-one Certain of these compounds are new. The new compounds and their method of preparation are disclosed in my copending application Ser. No. 372,599 filed of even date herewith. In general, they are prepared by reacting 6-azauracil (1,2,4-triazin-3,5-dione) with phosphorous pentasulfide to produce the known thio derivative 4-thio-6-azauracil. The thio derivative is then reacted with the appropriate amine or hydrazine in the presence of an alcohol. Compounds in which R is

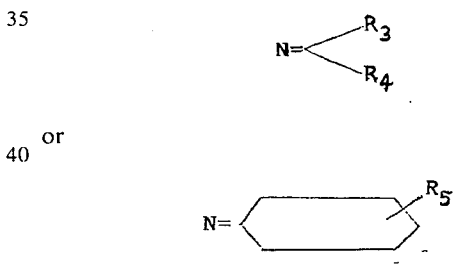

are prepared by further reaction of the above compound 4 with the appropriate aldehyde or ketone in the presence of an alcohol solvent and acid catalyst.

The growth inhibitor activity of the amino substituted triazines have been found to be largely restricted to compounds represented by the above formula. Where, for example, R is an alkyl group larger than propyl, activity is substantially reduced. Substitution of the 3-oxo group on the triazine ring by 3-thioxy also markedly reduces activity. Furthermore, replacement of the amino hydrogen with other groups affects a similar reduction in activity.

The preferred compounds of the invention are those in which R is hydrogen, furfuryl or

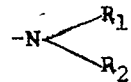

where $R_1$ and $R_2$ are hydrogen or methyl. Specifically, compounds 1, 2, 4 and 6 combine the most effective turf control properties with the lowest cost and are, therefore, the most preferred compounds for use in the practice of the invention. These four compounds also function to improve turf color and density. Compounds of the formula set forth above also exhibit pre-emergence turf control activity and, at least in the case of one compound — compound 5 — exhibit fungicidal properties.

The compounds of the invention are normally used in combination with a liquid or solid carrier. The compounds may, for example, be combined with water to form a foliar spray, containing in addition, surfactants and/or other adjuvants to provide a formulation capable of being conveniently and effectively applied to the turf.

The following examples illustrate the practice of the present invention.

EXAMPLE 1

Five turfgrass species were treated with an aqueous solution of each of the above identified eleven 1,2,4-triazinone compounds within the scope of Formula I. The solutions were prepared by adding 28 ml. of distilled water to 99 mgs. of the compound and adding 8 drops of Tween 20 (a polyoxyalkylene derivative of sorbition monolaurate) and 8 drops of acetone. Distilled water was then added to provide solutions containing 0.5 percent by volume acetone and 0.5 percent by volume Tween 20 and remainder distilled water. Aliquot solutions were then sprayed onto plots sufficient to provide 1, 5 and 16 lbs./acre of growth inhibitor for each of the turf species. The solutions were then sprayed onto samples of each of the turf species. Observations of turf quality (measure of injury) and growth inhibition were made 28 days after application. The results are set forth in Table I.

The results set forth in Table I indicate significant growth inhibition with compounds within the scope of the invention, particularly at the five and 16 lb/acre rate with little or no injury to the turf.

EXAMPLE 2

A second series of tests were run to compare the activity of the present compounds with equivalent amounts of 6-azauracil. Formulations were prepared as set forth in Example 1 containing 2,000 parts of growth inhibitor per million parts of water. Quality and inhibition were measured 27 days after application. Inhibition and quality results are coded as in Example 1.

TABLE I

| COMPOUND | RATE | PLANT SPECIES | | | | | | | | | |
|---|---|---|---|---|---|---|---|---|---|---|---|
| | | Bentgrass | | Poa Annua | | K-31 Fescue | | Wheatgrass[3] | | Windsor[4] | |
| | lbs/acre | Qual[1] | Inhib[2] | Qual | Inhib | Qual | Inhib | Qual | Inhib | Qual | Inhib |
| 1 | 1 | 1 | 3 | 1 | 3 | 1 | 2 | 1 | 2 | — | — |
| | 5 | 1 | 4 | 1 | 4 | 1 | 3 | 1 | 3 | — | — |
| 2 | 1 | 1 | 1 | 1 | 1 | 1 | 1 | 1 | 1 | — | — |
| | 5 | 1 | 4 | 1 | 4 | 1 | 3 | 1 | 2 | — | — |
| 3 | 1 | 1 | 1 | 1 | 1 | 1 | 1 | 1 | 1 | — | — |
| | 5 | 1 | 1 | 1 | 1 | 1 | 1 | 1 | 1 | — | — |
| | 16 | 1 | 3 | — | — | 1 | 2 | — | — | 1 | 3 |
| 4 | 1 | 1 | 4 | 1 | 4 | 1 | 4 | 1 | 2 | | |
| | 5 | 1 | 4 | 1 | 4 | 1 | 4 | 1 | 3 | | |
| | 16 | 1 | 5 | — | — | — | — | — | — | 1 | 5 |
| 5 | 1 | 1 | 3 | 1 | 3 | 1 | 2 | — | — | 1 | 3 |
| | 5 | 1 | 3 | 1 | 3 | 1 | 3 | — | — | 1 | 4 |
| 6 | 1 | 1 | 1 | 1 | 1 | 1 | 1 | — | — | 1 | 1 |
| | 10 | 1 | 1 | 1 | 2 | 1 | 2 | — | — | 1 | 1 |
| 7 | 1 | 1 | 1 | 1 | 1 | 1 | 1 | — | — | 1 | 1 |
| | 10 | 1 | 1 | 1 | 1 | 1 | 2 | — | — | 1 | 3 |
| 8 | 1 | 1 | 2 | 1 | 2 | 1 | 1 | — | — | 1 | 2 |
| | 10 | 1 | 4 | 1 | 3 | 1 | 3 | — | — | 1 | 3 |
| 9 | 1 | 1 | 1 | 1 | 1 | 1 | 1 | — | — | 1 | 1 |
| | 10 | 1 | 3 | 1 | 3 | 1 | 3 | — | — | 1 | 4 |
| 10 | 1 | 1 | 1 | 1 | 1 | 1 | 2 | — | — | 1 | 1 |
| | 10 | 1 | 3 | 1 | 3 | 1 | 3 | — | — | 1 | 4 |
| 11 | 1 | 1 | 1 | 1 | 1 | 1 | 1 | — | — | 1 | 1 |
| | 10 | 1 | 2 | 1 | 3 | 1 | 2 | — | — | 1 | 3 |

[1]Quality Code: 1–3 = excellent (little or no injury).
4–6 = fair
7–10 = poor
[2]Inhibition code: 1 = 0–20%
2 = 21–40%
3 = 41–60%
4 = 61–80%
5 = 81–100%
[3]Wheatgrass used as indicator plant for turfgrass response
[4]Variety of Kentucky bluegrass.

TABLE II

| COMPOUND | RATE | PLANT SPECIES | | | | | | | |
|---|---|---|---|---|---|---|---|---|---|
| | (ppm) | Windsor | | Park | | Chewings Fescue | | Fostoria Bentgrass | |
| | | Qual | Inhib | Qual | Inhib | Qual | Inhib | Qual | Inhib |
| 1 | 2000 | 1 | 3 | 1 | 4 | 1 | 3 | 1 | 5 |
| 6-Azauracil | 2000 | 9 | 5 | 7 | 5 | 9 | 5 | 9 | 5 |

Table II shows that at comparable rates, plants are damaged by 6-azauracil and growing poorly, whereas with compound I of the invention, plant growth is significantly inhibited without injury — i.e., still healthy but growing at a slower rate.

Additional comparative tests of compound 1 and 6-azauracil were run at application rates varying from 1/8 to 2 lbs/acre and at 200 and 2,000 ppm of growth inhibitor. In general, these tests confirmed the results set forth in Table II. At comparable rates of application, compound 1 achieved a significant degree of growth inhibition of a variety of turf species at a uniformly lower degree of injury than 6-azauracil.

The growth inhibiting compounds of the invention may be employed in the form of sprays, granules, drenches or dusts in combination with carriers, diluents, surfactants, sticking agents or solvents. Appropriate carriers include organic solvents, water, vermiculite, perlite, diatomaceous earth, clay, corn cobs, and other materials such as those described in the *Handbook of Dust Diluents and Carriers* (2d Ed.), 1955. Examples of diluents, surfactants, sticking agents and of other carriers and solvents which may be used in the present formulations are disclosed in U.S. Pat. No. 3,449,390 assigned to the present assignee. Other suitable solvents and sticking agents are described in U.S. Pat. Nos. 3,076,699 and 3,083,089, both assigned to the present assignee. The latter patents also disclose methods of making granular formulations, which may be used with the present compounds, by dissolving in an appropriate solvent and adhering to a carrier or by adhering to a carrier with a suitable sticking agent.

Other active substances may also be included in the present formulations including, but not limited to, pesticides, herbicides, other biological growth regulators and plant nutrients. U.S. Pat. Nos. 3,231,363 and 3,705,794, both assigned to the present assignee, disclose various combination products in which the compounds of the present invention may be incorporated.

I claim:

1. A process for inhibiting the growth of turf comprising applying to the turf a growth inhibiting amount of a compound of the formula

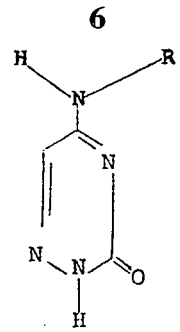

where R is selected from the group consisting of hydrogen, methyl, ethyl furfuryl,

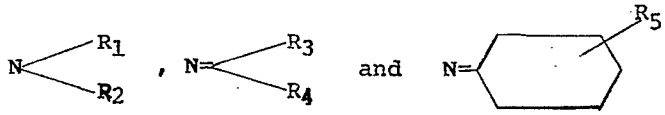

in which
  $R_1$ is selected from the group consisting of hydrogen and methyl;
  $R_2$ is selected from the group consisting of hydrogen, phenyl, acetyl and propionyl when $R_1$ is hydrogen and $R_2$ is methyl when $R_1$ is methyl;
  $R_3$ is selected from the group consisting of hydrogen and $C_1$–$C_6$ alkyl;
  $R_4$ is selected from the group consisting of $C_1$–$C_6$ alkyl, phenyl and $C_1$–$C_3$ carboalkoxy; and
  $R_5$ is selected from the group consisting of hydrogen and $C_1$–$C_6$ alkyl.

2. The process of claim 1 in which R is selected from the group consisting of furfuryl and

3. The process of claim 2 in which $R_1$ and $R_2$ are selected from the group consisting of hydrogen and methyl.

4. The process of claim 1 in which the compound is 5-amino-1,2,4-triazin-3(2H)-one.

5. The process of claim 1 in which the compound is 5-furfurylamino-1,2,4-triazin-3(2H)-one.

6. The process of claim 1 in which the compound is 5-(2',2'-dimethylhydrazino)-1,2,4-triazin-3(2H)-one.

7. The process of claim 1 in which the compound is 5-hydrazino-1,2,4-triazin-3(2H)-one.

* * * * *